United States Patent
Kelsey et al.

(10) Patent No.: US 10,445,632 B2
(45) Date of Patent: Oct. 15, 2019

(54) SECURE RFID TAG SYSTEMS AND METHODS

(71) Applicant: THE BOEING COMPANY, Chicago, IL (US)

(72) Inventors: William David Kelsey, Issaquah, WA (US); John William Glatfelter, Kennett Square, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/490,981

(22) Filed: Apr. 19, 2017

(65) Prior Publication Data
US 2018/0307960 A1    Oct. 25, 2018

(51) Int. Cl.
| | | |
|---|---|---|
| G06K 7/08 | (2006.01) | |
| G06K 19/06 | (2006.01) | |
| G06K 19/073 | (2006.01) | |
| G06K 19/07 | (2006.01) | |
| G06K 19/077 | (2006.01) | |

(52) U.S. Cl.
CPC ... *G06K 19/07345* (2013.01); *G06K 19/0723* (2013.01); *G06K 19/07775* (2013.01)

(58) Field of Classification Search
USPC ........................................ 235/451, 488, 492
See application file for complete search history.

(56) References Cited

U.S. PATENT DOCUMENTS

| | | | |
|---|---|---|---|
| 7,460,018 B2 | 12/2008 | Kubo | |
| 2005/0061579 A1* | 3/2005 | Barth | F01N 1/003 181/240 |
| 2005/0061879 A1* | 3/2005 | Honda | G07C 5/008 235/385 |
| 2007/0024445 A1* | 2/2007 | Weslake | G06K 19/07345 340/572.1 |
| 2007/0152829 A1* | 7/2007 | Lindsay | G06K 19/0717 340/572.3 |
| 2007/0290858 A1* | 12/2007 | Janke | G06K 19/025 340/572.7 |
| 2008/0069736 A1* | 3/2008 | Mingerink | B05B 11/0005 422/400 |
| 2008/0083829 A1* | 4/2008 | Lowe | A45C 11/18 235/486 |
| 2008/0186186 A1* | 8/2008 | Campbell | G06K 19/025 340/572.8 |
| 2009/0195363 A1* | 8/2009 | Downie | G06K 5/02 340/10.4 |
| 2010/0302012 A1* | 12/2010 | Roesner | G06K 7/0008 340/10.5 |
| 2013/0119144 A1* | 5/2013 | Suzuki | G06K 19/07794 235/492 |
| 2016/0342821 A1* | 11/2016 | Nyalamadugu | G06K 7/10297 |
| 2016/0371516 A1* | 12/2016 | Debates | G06K 19/07345 |
| 2017/0206447 A1* | 7/2017 | Sandock | G06K 19/07743 |

* cited by examiner

*Primary Examiner* — Tuyen K Vo
(74) *Attorney, Agent, or Firm* — Joseph M. Butscher; The Small Patent Law Group, LLC

(57) ABSTRACT

A radio frequency identification (RFID) tag system includes a first portion that is configured to be secured to a component, and a second portion that removably couples to the first portion. The RFID tag system is active when the first portion is coupled to the second portion. The RFID tag system is deactivated when the first portion is uncoupled from the second portion.

21 Claims, 6 Drawing Sheets

SECURE RFID TAG SYSTEMS AND METHODS

FIELD OF EMBODIMENTS OF THE DISCLOSURE

Embodiments of the present disclosure generally relate to radio frequency identification (RFID) systems and methods, and, more particularly, to secure RFID tag systems and methods.

BACKGROUND OF THE DISCLOSURE

Radio frequency identification (RFID) is an automatic identification technology that utilizes radio frequency electromagnetic fields to identify objects having RFID tags mounted thereto. When an RFID reader is within a particular range of an RFID tag, information from the RFID tag is transmitted to the RFID reader. A typical RFID tag includes an antenna that transmits information from the RFID tag to the RFID reader. Data is stored on a microchip of the RFID tag.

An RFID tag may store various types of information related to an item to which the RFID is attached or otherwise associated. Such information may include part commissioning data, an electronic product code, a part number, a cage code, manufacturer information, a serial number, a date of manufacture, and the like, as well as part records, such as a calibration date, a revision date, and the like. RFID tags allow information regarding components to be automatically gathered by an RFID reader, without the need for individuals to particularly inspect each component. As such, RFID tags allow for efficient and convenient tracking of components.

At the same time, security is of utmost importance to various entities, such as the military, various government agencies, financial institutions, and, indeed, even individuals who carry credit cards, for example. However, an emission signature of an RFID tag may undesirably expose the component to which the RFID tag is secured and/or information stored on the RFID tag. For example, an RFID tag mounted to a component of a military fighter jet may emit a distinct electromagnetic signature that may be tracked by an adversary. Further, an RFID tag on a credit card may emit an electromagnetic signature, along with information that may be intercepted by unscrupulous individuals.

All of the above must be balanced by the fact that various manufacturing and tracking processes would be complicated and prolonged without the use of RFID tags. For example, during a build process, quality assurance validation, and/or verification process for an aircraft, individuals would need to manually inspect hand written data and/or scan barcodes of various components if RFID tags were not used. As can be appreciated, such manual inspection would be labor and time intensive for various products, such as commercial and military aircraft.

SUMMARY OF THE DISCLOSURE

A need exists for a secure RFID tag system and method. Further, a need exists for a secure RFID tag system and method that allow for efficient tracking of a component while at the same time preventing undesired access to stored information.

With those needs in mind, certain embodiments of the present disclosure provide an RFID tag system that includes a first portion that is configured to be secured to a component, and a second portion that removably couples to the first portion. The RFID tag system is active when the first portion is coupled to the second portion. The RFID tag system is deactivated when the first portion is uncoupled from the second portion.

In at least one embodiment, the first portion includes one of an RFID chip that is configured to store data regarding the component, or an antenna that is configured to transmit the data to an RFID reader and/or receive data from the RFID reader. In at least one other embodiment, the second portion includes one of an RFID chip that is configured to store data regarding the component, or an antenna that is configured to transmit the data to an RFID reader and/or receive data from the RFID reader.

In at least one embodiment, one of the first portion or the second portion includes one of an information layer or an antenna layer. The other of the first portion or the second portion includes the other of the information layer or the antenna layer.

The first portion may include first antenna contacts, while the second portion may include second antenna contacts. The first antenna contacts electrically connect to the second antenna contacts when the first portion is coupled to the second portion and allow transmission of data from an antenna.

The first portion may include a first indicia that, when exposed, indicates that the RFID tag system is deactivated. The second portion may include a second indicia that differs from the first indicia. The second indicia indicates that the RFID tag system is active.

In at least one embodiment, the second portion includes a first antenna that operates at a first frequency. A replacement portion having a second antenna that operates at a second frequency that differs from the first frequency is configured to replace the second portion.

In at least one embodiment, the second portion includes a sticker or decal that is configured to peel off of the first portion.

Data stored in an RFID chip of the RFID system may be encrypted and/or password protected.

In at least one embodiment, the first portion includes first couplers and the second portion includes second couplers. The first couplers are configured to couple to the second couplers to couple the first portion to the second portion.

In at least one embodiment, one of the first portion or the second portion includes a plug. The other of the first portion or the second portion includes a receptacle that is configured to receive and retain the plug to couple the first portion to the second portion.

In at least one embodiment, the second portion is secured to an RFID reader.

The RFID tag system may also include a third portion that provides a physical security layer that blocks transmission of data from the RFID tag system. The third portion may include a copper mesh screen.

In at least one embodiment, the first portion includes a first sub-antenna and a first RFID sub-chip. The second portion includes a second sub-antenna and a second RFID sub-chip. The first and second sub-antennas connect together to form a functional antenna when the first portion is coupled to the second portion. The first and second RFID sub-chips connect together to form a functional RFID chip when the first portion is coupled to the second portion.

In at least one embodiment, one of the first portion or the second portion includes a sleeve that is configured to receive the other of the first portion or the second portion.

Certain embodiments of the present disclosure provide a radio frequency identification (RFID) tag method that includes securing a first portion of an RFID tag system to a component, removably coupling a second portion of the RFID tag system to the first portion, activating the RFID tag system when the first portion is coupled to the second portion, and deactivating the RFID tag system when the first portion is uncoupled from the second portion.

DETAILED DESCRIPTION OF THE DISCLOSURE

Figure 1:
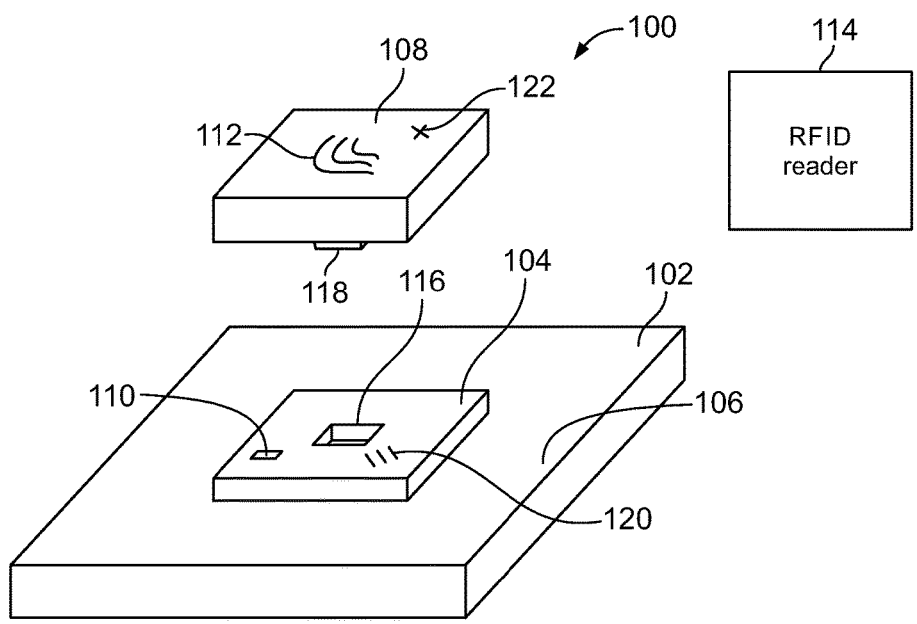
FIG. 1 is a diagrammatic representation of a top perspective view of an RFID tag system in relation to a component, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a radio frequency identification (RFID) tag system that includes a first portion that is configured to be secured to a component, and a second portion that is removably coupled to the first portion. The RFID tag system is active (for example, able to transmit data) when the first portion is coupled (for example, electrically and mechanically connected) to the second portion. The RFID tag system is deactivated (for example, unable to transmit data) when the first portion is uncoupled from the second portion.

Certain embodiments of the present disclosure provide an RFID tag system that includes a first portion that removably couples to a second portion. The first portion or the second portion is secured to a component. The first portion or the second portion includes an RFID chip, such as a processor coupled to a memory, which stores information about the component. The other of the first portion or the second portion includes an antenna. When the first portion is coupled to the second portion, the RFID tag system is operable to transmit data stored in the RFID chip when the RFID tag is within an electric field of an RFID reader. When the first portion is decoupled from the second portion, the RFID tag system is prevented from transmitting the information. The coupling between the first and second portions activates the RFID tag system (when the RFID tag is within an electric field of an RFID reader), while decoupling/uncoupling the first portion from the second portion deactivates the RFID tag system so that the RFID tag system does not transmit data from the RFID chip.

In at least one embodiment, the first portion includes an information layer, which includes the RFID chip, and the second portion includes an antenna layer. The information layer includes first antenna contacts and the antenna layer includes second antenna contacts. In at least one embodiment, when the antenna layer is coupled to the information layer, the first antenna contacts operatively couple (electrically connect) to the second antenna contacts, thereby activating the antenna layer and allowing information stored in the information layer to be transmitted by the antenna layer.

Certain embodiments of the present disclosure provide a layered RFID tag system that includes an RFID microchip layer having a first set of antenna contacts, and, a removable antenna layer with a second set of antenna contacts. The first set of antenna contacts and the second set of antenna contacts are electrically connected to one another when the RFID tag is in an active state.

In at least one embodiment, the microchip layer includes a first indicia (such as a first color, text, symbol, graphic, or the like) and the antenna layer includes a second indicia that differs from the first indicia. The first indicia is viewable when the antenna layer is removed from the microchip layer. The second indicia is viewable when the antenna layer is coupled to the microchip layer. The first indicia indicates that the antenna has been removed, and therefore the digital signature of the RFID tag system is not being emitted. The second indicia indicates that the antenna layer is coupled to the microchip layer and therefore, the digital signature of the RFID tag system is being emitted.

In at least one embodiment, the antenna layer transmits at a particular frequency. The antenna layer may be removed, and replaced with a different antenna layer that transmits at a different frequency. In this manner, the RFID tag system may be updated based on transmission requirements within a particular setting. For example, instead of discarding the entire RFID tag system when a different transmission frequency is desired or even required (so as not to electromagnetically interfere with other components within a particular environment, for example), the antenna layer may be removed and replaced with a compliant antenna layer.

In at least one embodiment, the first portion may be removably coupled to the second portion, such as through an adhesive base, decal, sticker, or the like. In this manner, the second portion may be peeled off the second portion, or vice versa. In at least one other embodiment, the first and second portion may be mechanically coupled together, such as through an interference fit, a plug and socket connection, a slidable engagement, a hook-and-loop, and Velcro connections, for example.

FIG. 1 is a diagrammatic representation of a top perspective view of an RFID tag system 100 in relation to a component 102, according to an embodiment of the present disclosure. The component 102 may be any type of component that is to be tracked through RFID. The RFID tag system 100 includes a first portion 104 that is secured to the component 102. The first portion 104 may be mounted on a surface 106 (such as a top, bottom, side, or the like) of the component 102. For example, the first portion 104 may be adhesively secured to the component 102. In at least one other embodiment, the first portion 104 may be secured to the component by one or more fasteners. In at least one other embodiment, the first portion 104 may be at least partially embedded within the component 102.

The RFID tag system 100 also includes a second portion 108 that removably couples to the first portion 104. As shown, the first portion 104 may be a first layer, while the second portion 108 may be a second layer. Optionally, the second portion 108 may be mounted to the component 102, while the first portion 104 is configured to removably detach from the mounted second portion 108.

The first portion 104 includes an RFID chip 110, such as a processor coupled to a memory, which stores information about the component 102. For example, the information stored on RFID chip 110 may include, but is not limited to, part commissioning data, an electronic product code, a part number, a cage code, manufacturer information, a serial number, a date of manufacture, and the like, as well as part records, such as a calibration date, a revision date, and the like.

The second portion 108 includes an antenna 112. Optionally, the second portion 108 may include the RFID chip 110, while the first portion 104 includes the antenna 112.

When the first portion 104 and the second portion 108 are coupled to one another, the RFID tag system 100 is active and capable of transmitting data stored in the RFID chip 110 to an RFID reader 114 (when within an appropriate range of the RFID reader 114), and/or vice versa. When the first portion 104 is decoupled from the second portion 108 (as shown in FIG. 1), the RFID tag system 100 is deactivated and unable to transmit the information from the RFID chip 110, thereby eliminating, minimizing, or otherwise reducing an emission signature of the RFID tag system 100. The coupling between the first portion 104 and the second portion 108 activates the RFID tag system 100 to transmit data within the RFID chip 110 via the antenna 112. In contrast, when the first portion 104 is decoupled from the second portion 108, the RFID tag system 100 is deactivated. It is to be assumed that the term "activates" in connection with the coupling of the first portion 104 and the second portion 108 means when in the operative range of an RFID reader.

In at least one embodiment, the first portion 104 provides an information layer, which includes the RFID chip 110, and the second portion 108 provides an antenna layer. Optionally, the first portion 104 may provide the antenna layer, while the second portion 108 provides the information layer.

The first portion 104 includes one or more first antenna contacts 116 and the second portion 108 includes one or more second antenna contacts. 118 When the first portion 104 is operatively coupled to the second portion 108, the first antenna contacts 116 operatively couple (for example, electrically connect) to the second antenna contacts 118, thereby activating the antenna 112 and allowing information stored in the RFID chip 110 to be transmitted by the antenna 112 to the RFID reader 114.

The first portion 104 may include a first indicia 120 (such as a first color, text, symbol, graphic, and/or the like) and the second portion 104 may include a second indicia 122 that differs from the first indicia 120. The first indicia 120 is viewable when the second portion 108 is removed from the first portion 104. For example, when the second portion 108 overlays the first portion 104, the first indicia 120 is covered and hidden from view. However, when the second portion 108 is removed from the first portion 104 (as shown in FIG. 1), the first indicia 120 is exposed and viewable. The first indicia 120 indicates that the second portion 108 is removed from the first portion 104, and therefore indicates that the digital signature of the RFID tag system 100 is not able to be emitted. In contrast, the second indicia 122 indicates that the second portion 108 is coupled to the first portion 104, and therefore the digital signature of the RFID tag system 100 may be emitted.

The RFID chip 110 may be powered through the electric field of the RFID reader 114. In at least one other embodiment, the RFID chip 110 may be at least partially self-powered, such as through a battery.

Figure 2:
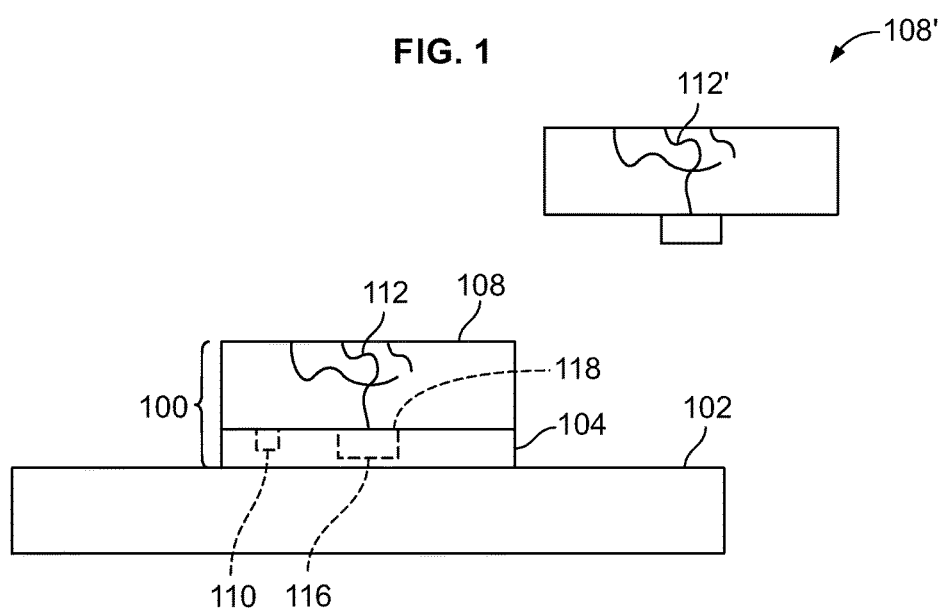
FIG. 2 is a diagrammatic representation of a front view of an RFID tag system secured to a component, according to an embodiment of the present disclosure.

FIG. 2 is a diagrammatic representation of a front view of the RFID tag system 100 secured to the component 102, according to an embodiment of the present disclosure. As shown in FIG. 2, the first and second portions 104 and 108 are operatively coupled together. As such, the first antenna contacts 116 of the first portion 104 are aligned with and connected to the second antenna contacts 118 of the second portion 108, thereby activating the RFID tag system 100 so that information regarding the component 102 that is stored in the RFID chip 110 may be transmitted by the antenna 112 when in an operative range of an RFID reader.

In at least one embodiment, the antenna 112 transmits at a particular frequency. The second portion 108 may be removed from the first portion 104 (as shown and FIG. 1). The second portion 108 may be replaced with a different second portion 108' having a different antenna 112' that transmits at a frequency that differs from the antenna 112. In this manner, the RFID tag system 100 may be updated based on transmission requirements within a particular setting. For example, instead of discarding the entire RFID tag system 100 when a different transmission frequency is desired or even required (so as not to electromagnetically interfere with other components within a particular environment, for example), the second portion 108 (such as an antenna layer) may be removed and replaced with the second portion 108'. The second portion 108' provides a replacement portion that may replace the second portion 108.

In at least one embodiment, the first portion may be removably coupled to the second portion, such as through an adhesive. In this manner, the second portion may be peeled off the second portion, or vice versa. In at least one other embodiment, the first and second portions may be mechanically coupled together, such as through an interference fit, a plug and socket connection, a slidable engagement, and/or the like.

Referring to FIGS. 1 and 2, when the first portion 104 is operatively coupled to the second portion 108, the RFID system 100 is active and functional, and able to transmit information stored on the RFID chip 110 via the antenna 112. When the first and second portions 104 and 108 are decoupled from one another, the RFID system 100 is deactivated and disabled such that the antenna 112 is unable to transmit.

The first and second portions 104 and 108 may be configured to be repeatedly coupled together and decoupled. That is, the second portion 108 may be removed and reconnected to the first portion 104. In other embodiments, the second portion 108 is not capable of being reconnected to the first portion 104 after removal. In at least one other embodiment, the RFID system 100 may be permanently disabled from use when the second portion 108 is decoupled from the first portion 104.

In at least one embodiment, the second portion 108 may include a keying feature that is configured to be mated with a reciprocal keying feature of the first portion 104. The keying features ensure that only compatible first and second portions 104 and 108 are coupled together.

Further, embodiments of the present disclosure may include additional security features. For example, data stored within the RFID chip 110 may be encrypted, password protected, and/or the like.

Figure 3:
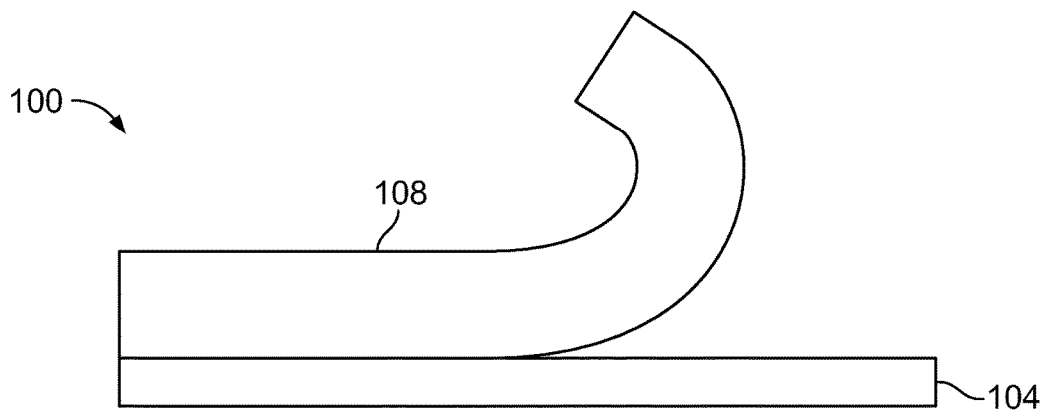
FIG. 3 is a diagrammatic representation of a front view of an RFID tag system, according to an embodiment of the present disclosure.

FIG. 3 is a diagrammatic representation of a front view of the RFID tag system 100, according to an embodiment of the present disclosure. The second portion 108 may include an adhesive base or substrate (such as a decal or sticker) that is configured to be peeled off the first portion 104. Optionally, the first portion 104 may be an adhesive layer that is configured to be peeled off the second portion 108.

Figure 4:
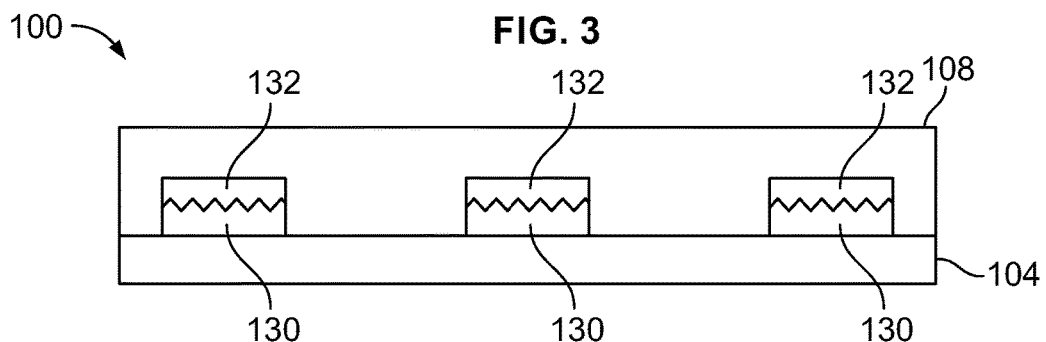
FIG. 4 is a diagrammatic representation of a front view of an RFID tag system, according to an embodiment of the present disclosure.

FIG. 4 is a diagrammatic representation of a front view of the RFID tag system 100, according to an embodiment of the present disclosure. In this embodiment, the first and second portions 104 and 108 may include couplers 130 and 132, respectively, which are configured to removably couple the first and second portions 104 and 108 together. For example, the couplers 130 and 132 may be counterpart Velcro pads, reciprocal tabs and slots, fasteners (such as nuts and bolts), and/or the like.

Figure 5:
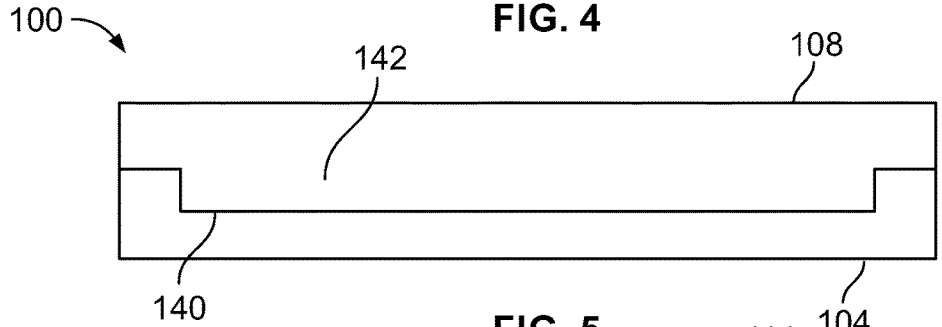
FIG. 5 is a diagrammatic representation of a front view of an RFID tag system, according to an embodiment of the present disclosure.

FIG. 5 is a diagrammatic representation of a front view of the RFID tag system 100, according to an embodiment of the present disclosure. In this embodiment, the first portion 104 includes a receptacle 140 that removably receives and retains a reciprocal plug 142 of the second portion 108, so that the first and second portions 104 and 108 may be removably coupled to one another. Optionally, the first portion 104 may include the plug 142, while the second portion 108 includes the receptacle 140.

Figure 6:
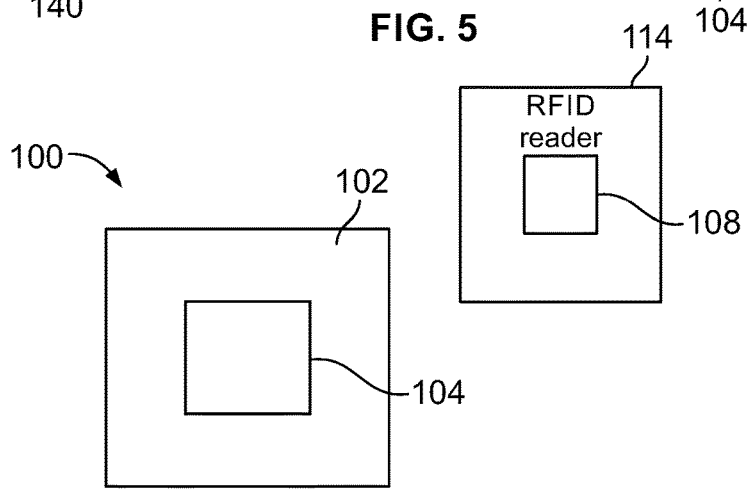
FIG. 6 is a schematic representation of an RFID tag system, according to an embodiment of the present disclosure.

FIG. 6 is a schematic representation of the RFID tag system 100, according to an embodiment of the present disclosure. In this embodiment, the second portion 108 may be secured to the RFID reader 114 (such as a handheld device), while the first portion 104 is secured to the component 102. Optionally, the second portion 108 may be secured to the component 102, while the first portion 104 is secured to the RFID reader 114. In operation, in order to transmit data from the RFID tag system 100 to the RFID reader 114, the RFID reader 114 is moved into close proximity (for example, into contact with) to the first portion 104 so that the second portion 108 couples to the first portion 104, as described above. After the information from the first portion 104 is transmitted to the RFID reader 114, the RFID reader 114 is removed so that the first portion 104 decouples from (for example, no longer in contact with) the second portion 108, thereby deactivating emissions from the RFID tag system 100.

Figure 7:
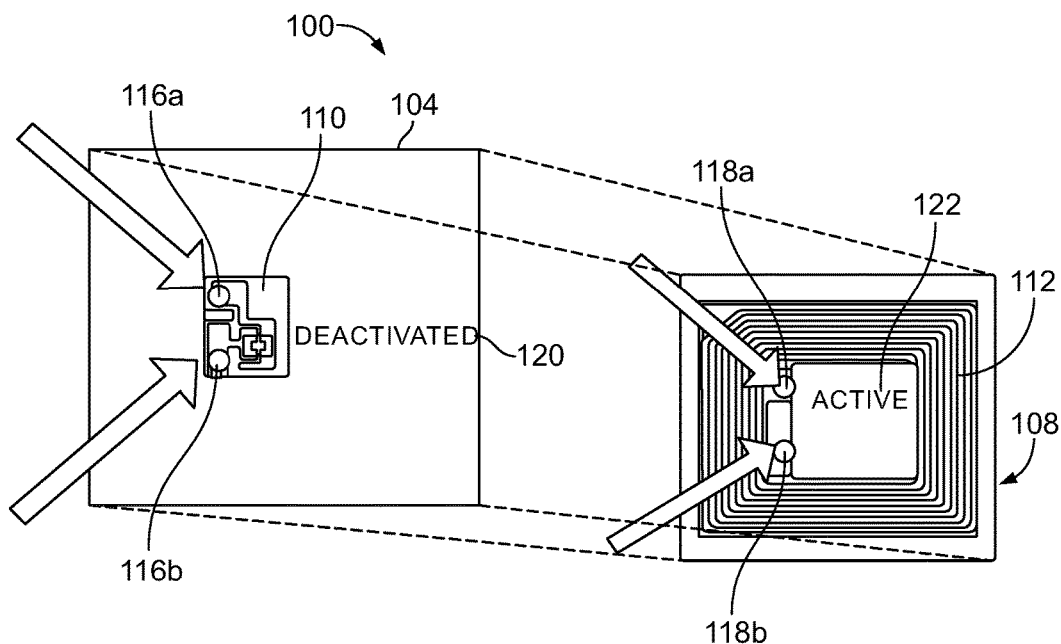
FIG. 7 is a diagrammatic representation of a top view of an RFID tag system, according to an embodiment of the present disclosure.

FIG. 7 is a diagrammatic representation of a top view of the RFID tag system 100, according to an embodiment of the present disclosure. In this embodiment, the first portion 104 is an information layer including the RFID chip 110, while the second portion 108 is an antenna layer including the antenna 112.

In order to activate the RFID system 100 so that information from the RFID chip 110 may be transmitted by the antenna 112, the second portion 108 is aligned over the first portion 104 so that antenna contacts 118a and 118b of the second portion 108 are aligned over the respective antenna contacts 116a and 116b of the first portion 104. The second portion 108 is then mated with the first portion 104 so that the antenna contacts 118a and 118b mate and electrically connect with the respective antenna contacts 116a and 116b, thereby activating the antenna 112. As such, information stored in the RFID chip 110 may then be transmitted to an RFID reader through the activated antenna 112.

The indicia 120 on the first portion 104 may include a color code (for example, green color) and text, such as "DEACTIVATED," indicative of deactivated state when viewable (such as when the second portion 108 is removed from the first portion 104). Conversely, the indicia 122 on the second portion 108 may include a different color code (for example, red color) and different text, such as "ACTIVE," indicative of an active when viewable (such as when the second portion 108 is securely connected on and over the first portion 104).

Figure 8:
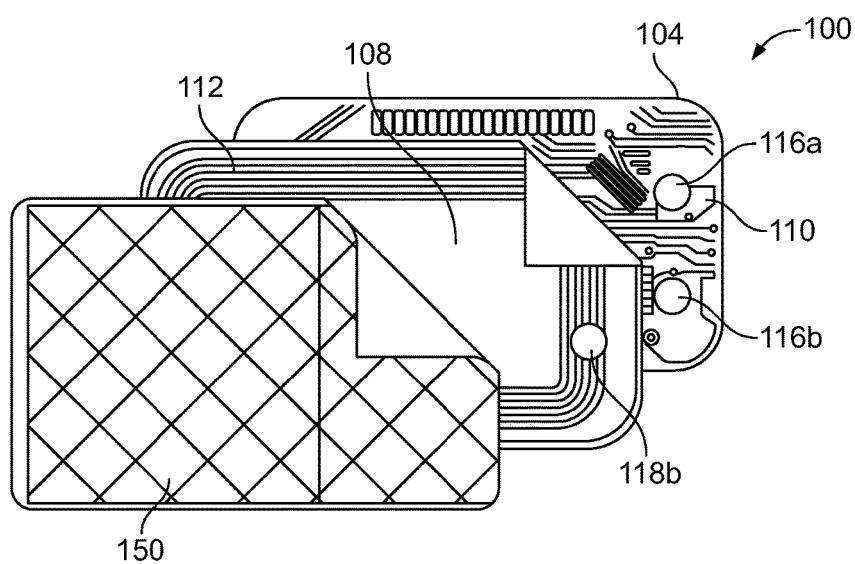
FIG. 8 is a diagrammatic representation of a top view of an RFID tag system, according to an embodiment of the present disclosure.

FIG. 8 is a diagrammatic representation of a top view of the RFID tag system 100, according to an embodiment of the present disclosure. In this embodiment, the RFID tag system 100 includes a third portion 150 that mounts over the first and second portions 104 and 108. The third portion 150 provides a physical security layer, such as a copper mesh Faraday screen that blocks transmission from the antenna 112. When the third portion 150 is removed, information from the RFID chip 110 may be transmitted by the antenna 112 when the first portion 104 is operatively coupled to the second portion 108. The third portion 150 provides additional security for the RFID tag system 100. The added security feature of the third portion 150 is physically removed from the RFID tag system 100 in order to allow transmission from the RFID tag system 100. The third portion 150 may be used with any of the embodiments of the present disclosure.

Figure 9:
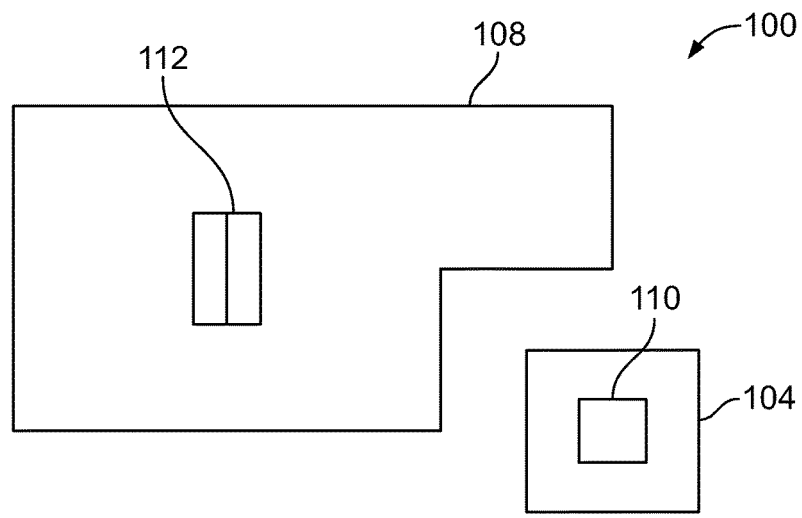
FIG. 9 is a diagrammatic representation of a top view of an RFID tag system, according to an embodiment of the present disclosure.

FIG. 9 is a diagrammatic representation of a top view of the RFID tag system 100, according to an embodiment of the present disclosure. In this embodiment, the first portion 104 is substantially smaller than the second portion 108 (or vice versa). Further, instead of overlaying, the first and second portions 104 and 108 may connect in an edge-to-edge orientation. The first and second portions 104 and 108 may be sized and shaped differently than shown.

Figure 10:
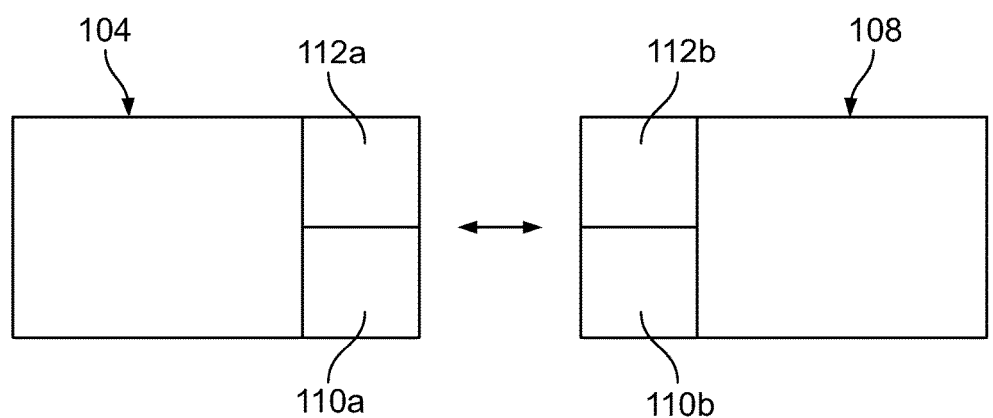
FIG. 10 is a diagrammatic representation of a front view of an RFID tag system, according to an embodiment of the present disclosure.

FIG. 10 is a diagrammatic representation of a front view of the RFID tag system 100, according to an embodiment of the present disclosure. In this embodiment, the first portion 104 may include a first sub-antenna 112a, and a first RFID sub-chip 110a, while the second portion 108 includes a second sub-antenna 112b, and a second RFID sub-chip 110b. When matted together in an edge-to-edge fashion, the first and second sub-antennas 112a and 112b connect together to form a functional antenna, while the first and second RFID sub-chips 110a and 110b connect together to form a functional RFID chip. Optionally, the first and second portions 104 and 108 may be layers such that one portion mounts over the other portion.

As shown, the first and second sub-antennas 112a and 112b may each be a half portion, while the first and second RFID sub-chips 110a and 110b may each be a half portion. Optionally, one sub-antenna 112a or 112b may be less than a half portion, while the other sub-antenna 112a or 112b is more than a half portion, and one RFID sub-chip 110a or 110b may be less than a half portion, while the other RFID sub-chip 110a or 110b may be more than a half portion.

Also, optionally, one of the first or second portions 104 or 108 may include a single, fully-functional RFID chip 110 (such as shown in FIG. 1). However, information from the RF chip is only transmitted when the first and second sub-antennas 112a and 112b are mated together to form a functional antenna.

As another option, one of the first or second portions 104 or 108 may include a single, fully-functional antenna 112 (such as shown in FIG. 1). However, in this option, the first and second RFID sub-chips 110a and 110b need to be mated together to form a functional RFID chip.

Figure 11:
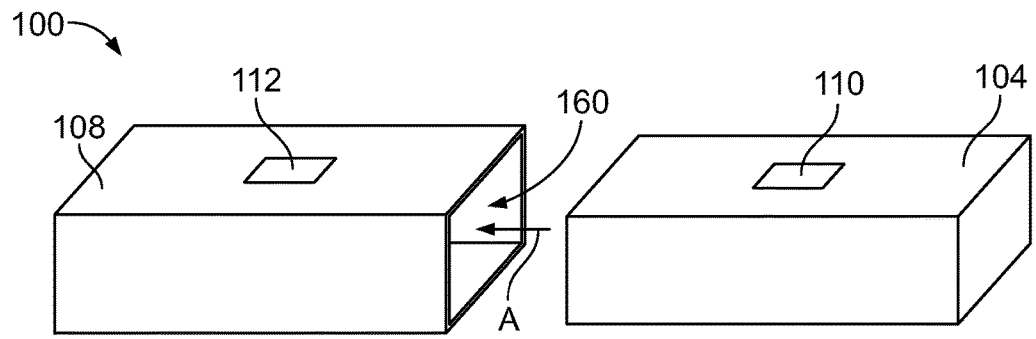
FIG. 11 is a diagrammatic representation of a front view of an RFID tag system, according to an embodiment of the present disclosure.

FIG. 11 is a diagrammatic representation of a front view of the RFID tag system 100, according to an embodiment of the present disclosure. In this embodiment, the second portion 108 may be a sleeve having an internal passage 160 into which the first portion 104 is slid into in the direction of arrow A in order to provide an operative coupling therebetween. Optionally, the first portion 104 may be the sleeve that receives the second portion 108.

Figure 12:
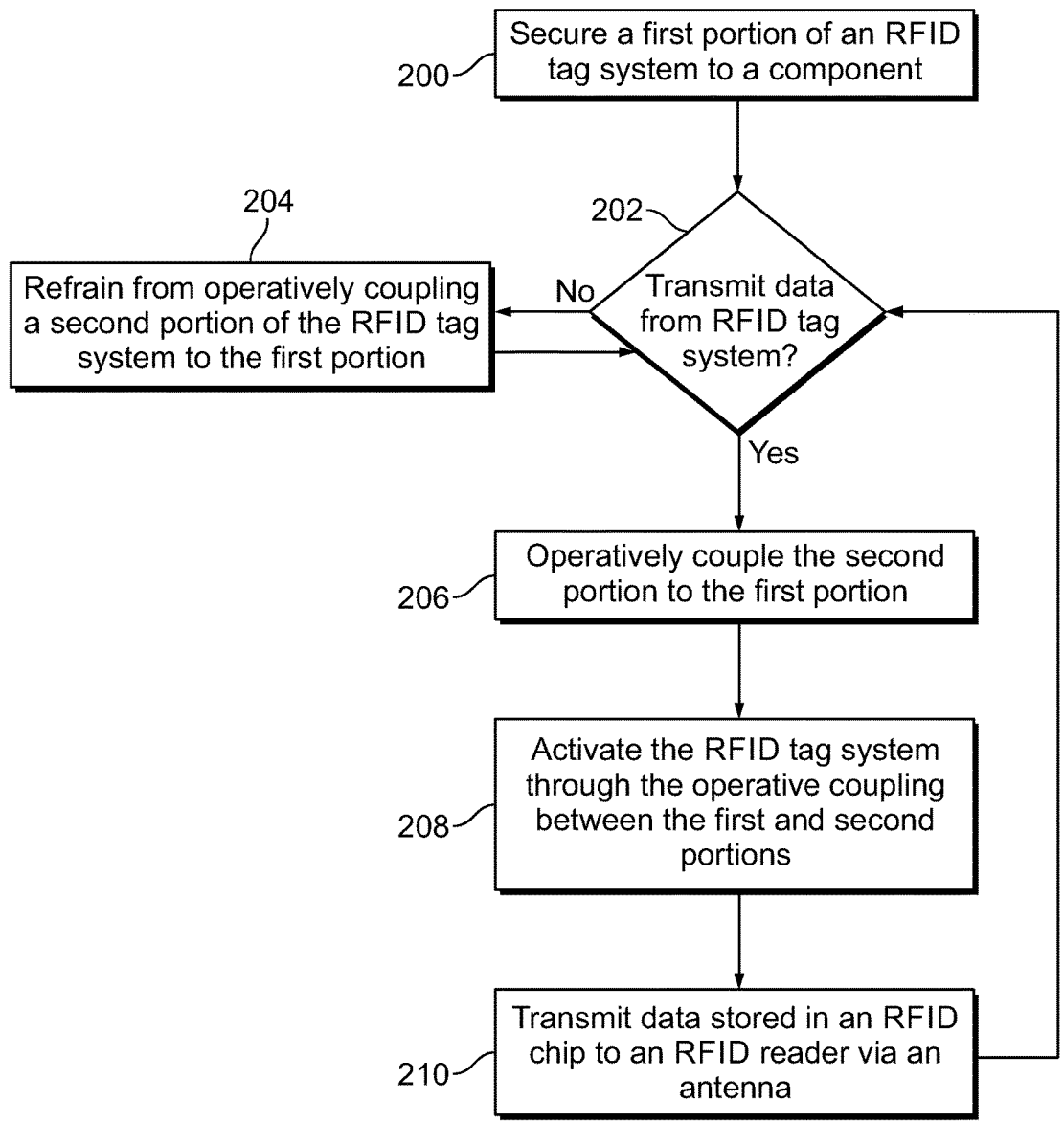
FIG. 12 is a flow chart of an RFID tag method, according to an embodiment of the present disclosure.

FIG. 12 is a flow chart of an RFID tag method, according to an embodiment of the present disclosure. Referring to FIGS. 1 and 2, the method begins at 200, at which the first portion 104 of the RFID tag system 100 is secured to the component 102.

At 202, it is determined whether data is to be transmitted from the RFID tag system 100. If not, the method proceeds to 204, at which the second portion 108 is not coupled to the first portion 104.

If, however, data is to be transmitted from the RFID tag system 100 at 202, the method proceeds to 206, at which the second portion 108 is operatively coupled to the first portion 104. At 208, the RFID tag system 100 is activated through the operative coupling between the first and second portions 104 and 108. At 210, data stored in the RFID chip 110 is transmitted to the RFID reader 114 via the antenna 112. The method then returns to 202. In addition to the RFID chip 110 transmitting data to the RFID reader 114, while data in the RFID chip 110 is transmitted to the RFID reader 114, data from the RFID reader 114 may be transmitted to the RFID chip 110.

Figure 13:
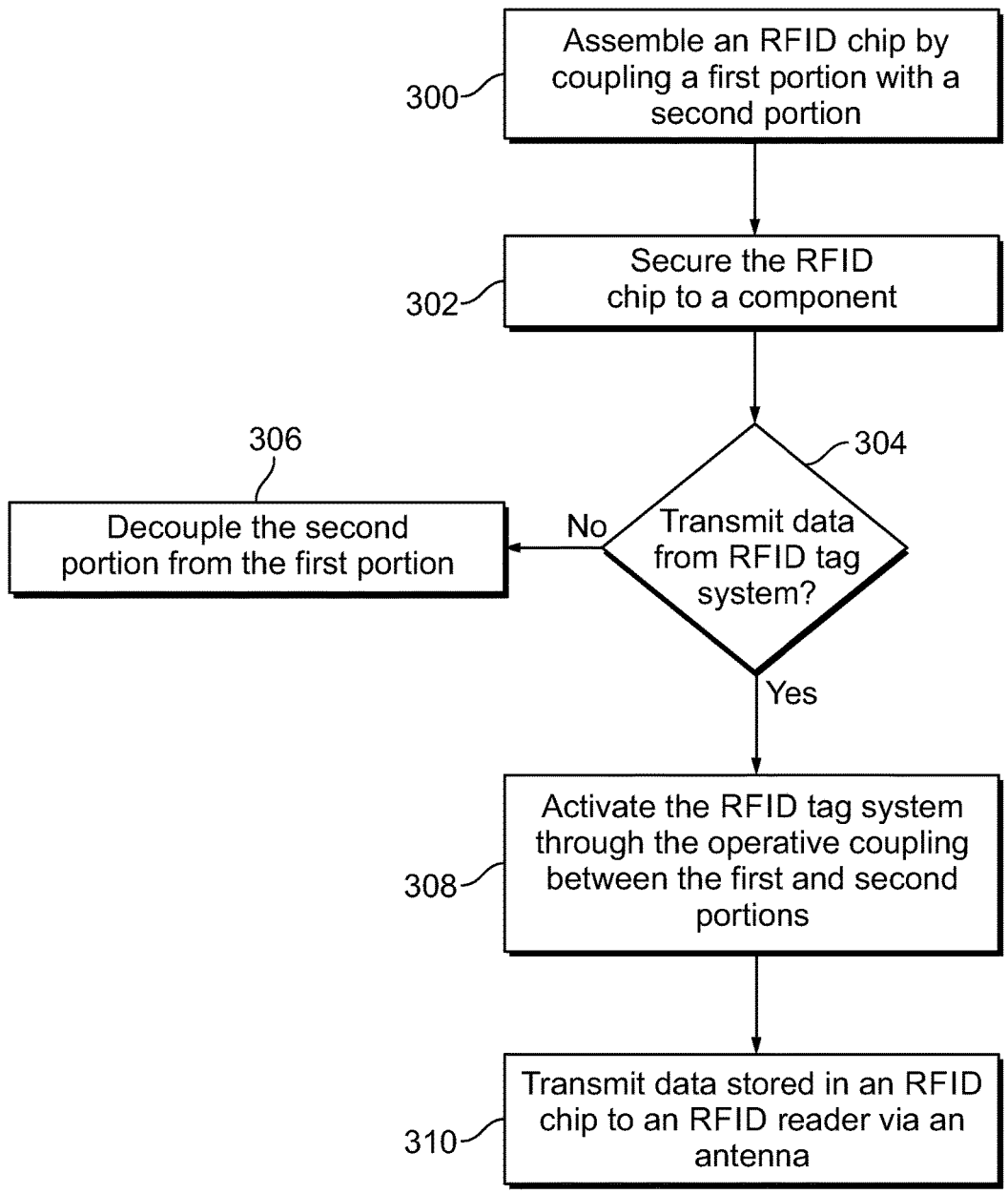
FIG. 13 is a flow chart of an RFID tag method, according to an embodiment of the present disclosure.

FIG. 13 is a flow chart of an RFID tag method, according to an embodiment of the present disclosure. In this embodiment, the method begins at 300, at which an RFID chip 110 is assembled by coupling a first portion 104 with a second portion 108. At 302, the assembled RFID chip 110 is secured to a component 102.

At 304, it is determined whether data is to be transmitted from the RFID tag system 100. If not, the method proceeds to 306, at which the second portion 108 is decoupled from the first portion 104.

If, however, data is to be transmitted at 304, the method proceeds to 308, at which the RFID tag system 100 is activated through the operative coupling between the first and second portion 104 and 108 within the operative range of an RFID reader 114. At 310, data stored in the RFID chip 110 is transmitted to the RFID reader 114 via an antenna 112.

As described above, embodiments of the present disclosure provide a secure RFID tag system and method. Embodiments of the present disclosure provide a secure RFID tag system and method that allow for efficient tracking of a component while at the same time preventing undesired access to stored information.

Embodiments of the present disclosure are particularly well-suited for certain military vehicles (or components). For example, the first and second portions 104 and 108 of the RFID tag systems 100 on such vehicles may be decoupled from one another, so that the RFID tag systems 100 do not alter emission signatures of the vehicles. Further, embodiments of the present disclosure may be used with credit cards, passports, and the like in order to prevent undesired scanning of RFID-enabled personal information.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A radio frequency identification (RFID) tag system comprising:
   a first portion that is configured to be secured to a component; and
   a second portion that is removably coupled to the first portion, wherein the second portion is configured to disconnect from and reconnect to the first portion, wherein the second portion covers the first portion when the second portion is connected to the first portion,
   wherein the RFID tag system is active when the first portion is coupled to the second portion, wherein the RFID tag system is active when the second portion is reconnected to the first portion after the second portion is disconnected from the first portion, wherein the RFID tag system is deactivated when the first portion is disconnected from the second portion; and wherein the first portion and the second portion are deactivated when the first portion is disconnected from the second portion; wherein the first portion comprises a first sub-antenna and a first RFID sub-chip, wherein the second portion comprises a second sub-antenna and a second RFID sub-chip, wherein the first and second sub-antennas connect together to form a functional antenna when the first portion is coupled to the second portion, and wherein the first and second RFID sub-chips connect together to form a functional RFID chip when the first portion is coupled to the second portion.

2. The RFID tag system of claim 1, wherein the first portion comprises one of:
   an RFID chip that is configured to store data regarding the component; or
   an antenna that is configured to transmit the data to or receive data from an RFID reader.

3. The RFID tag system of claim 1, wherein the second portion comprises one of:
   an RFID chip that is configured to store data regarding the component; or
   an antenna that is configured to transmit the data to or receive data from an RFID reader.

4. The RFID tag system of claim 1, wherein one of the first portion or the second portion comprises one of an information layer or an antenna layer, and wherein the other of the first portion or the second portion comprises the other of the information layer or the antenna layer.

5. The RFID tag system of claim 1, wherein the first portion comprises first antenna contacts, and the second portion comprises second antenna contacts, wherein the first antenna contacts electrically connect to the second antenna contacts when the first portion is coupled to the second portion and allow transmission of data from an antenna when in an electric field of an RFID reader.

6. The RFID tag system of claim 1, wherein the first portion comprises a first indicia that, when exposed, indicates that the RFID tag system is deactivated, wherein the second portion comprises a second indicia that differs from the first indicia, wherein the second indicia indicates that the RFID tag system is active, wherein the first indicia is covered by the second indicia when the first portion is coupled to the second portion.

7. The RFID tag system of claim 1, wherein the second portion comprises a first antenna that operates at a first frequency, and wherein a replacement portion, having a second antenna that operates at a second frequency that differs from the first frequency, is configured to replace the second portion.

8. The RFID tag system of claim 1, wherein the second portion comprises an adhesive base that is configured to peel off of the first portion.

9. The RFID tag system of claim 1, wherein one of the first portion or the second portion comprises an RFID chip that stores data, wherein the data is one or both of encrypted or password protected.

10. The RFID tag system of claim 1, wherein the first portion comprises first couplers and the second portion comprises second couplers, wherein the first couplers are configured to couple to the second couplers to couple the first portion to the second portion.

11. The RFID tag system of claim 1, wherein one of the first portion or the second portion comprises a plug, and wherein the other of the first portion or the second portion comprises a receptacle that is configured to receive and retain the plug to couple the first portion to the second portion.

12. The RFID tag system of claim 1, wherein the second portion is secured to an RFID reader.

13. The RFID tag system of claim 1, further comprising a third portion that provides a physical security layer that blocks transmission of data from the RFID tag system.

14. The RFID tag system of claim 13, wherein the third portion comprises a copper mesh screen.

15. The RFID tag system of claim 1, wherein one of the first portion or the second portion comprises a sleeve that is configured to receive the other of the first portion or the second portion, wherein the sleeve includes an internal passage into which the other of the first portion or the second portion is slid in order to provide an operative coupling between the first portion and the second portion.

16. A radio frequency identification (RFID) tag method comprising:
   securing a first portion of an RFID tag system to a component;
   removably coupling a second portion of the RPID tag system to the first portion* wherein the second portion is configured to disconnect from the first portion, wherein the removably coupling comprises disconnecting the second portion from the first portion and reconnecting the second portion to the first portion, wherein the second portion covers the first portion when the second portion is connected to the first portion;
   activating the RFID tag system when the first portion is coupled to the second portion, wherein the RFID tag system is also active when the second portion is reconnected to the first portion after the second portion is disconnected from the first portion; and
   deactivating the RFID tag system when the first portion is disconnected from the second portion, wherein the deactivating comprises deactivating the first portion and the second portion;
   wherein the first portion comprises a first sub-antenna and a first RFID sub-chip, wherein the second portion comprises a second sub-antenna and a second RFID sub-chip, wherein the first and second sub-antennas connect together to form a functional antenna when the first portion is coupled to the second portion, and wherein the first and second RFID sub-chips connect together to form a functional RFID chip when the first portion is coupled to the second portion.

17. The RFID tag method of claim 16, wherein the activating comprises electrically connecting first antenna contacts of the first portion to second antenna contacts of the second portion.

18. The RFID tag method of claim 16, further comprising:
exposing a first indicia of the first portion to indicate that the RFID tag system is activated or deactivated;
exposing a second indicia of the second portion that differ from the first indicia to indicate that the RFID tag system is the other of activated or deactivated; and
covering one of the first indicia or the second indicia.

19. The RFID tag method of claim 16, further comprising:
operating a first antenna of the second portion at a first frequency; and
replacing the second portion with a replacement portion having a second antenna that operates at a second frequency that differs from the first frequency.

20. A radio frequency identification (RFID) tag system comprising:
a first portion that is configured to be secured to a component, wherein the first portion includes: (a) first antenna contacts, (b) a first indicia that, when exposed, indicates that the RFID tag system is deactivated, and (c) one of an RFID chip that is configured to store data regarding the component, or an antenna that is configured to transmit the data to an RFID reader, wherein the data is one or both of encrypted or password protected; and
a second portion that removably couples to the first portion, wherein the second portion is configured to disconnect from and reconnect to the first portion, wherein the second portion covers the first portion when the second portion is connected to the first portion, wherein the second portion includes: (a) second antenna contacts, (b) a second indicia that differs from the first indicia, and wherein the second indicia indicates that the RFID tag system is active, and (c) the other of the RFID chip that is configured to store data regarding the component, or the antenna that is configured to transmit the data to the RFID reader,
wherein the RFID tag system is active when the first portion is coupled to the second portion, wherein the RFID tag system is active when the second portion is reconnected to the first portion after the second portion is disconnected from the first portion, wherein the first antenna contacts electrically connect to the second antenna contacts when the first portion is coupled to the second portion and allow transmission of data from the antenna, and wherein the RFID tag system is deactivated when the first portion is disconnected from the second portion;
wherein the first portion comprises a first sub-antenna and a first RFID sub-chip, wherein the second portion comprises a second sub-antenna and a second RFID sub-chip, wherein the first and second sub-antennas connect together to form a functional antenna when the first portion is coupled to the second portion, and wherein the first and second RFID sub-chips connect together to form a functional RFID chip when the first portion is coupled to the second portion.

21. The RFID tag system of claim 20, further comprising a third portion that provides a physical security layer that blocks transmission of data from the RFID tag system.

* * * * *